Figure 1:
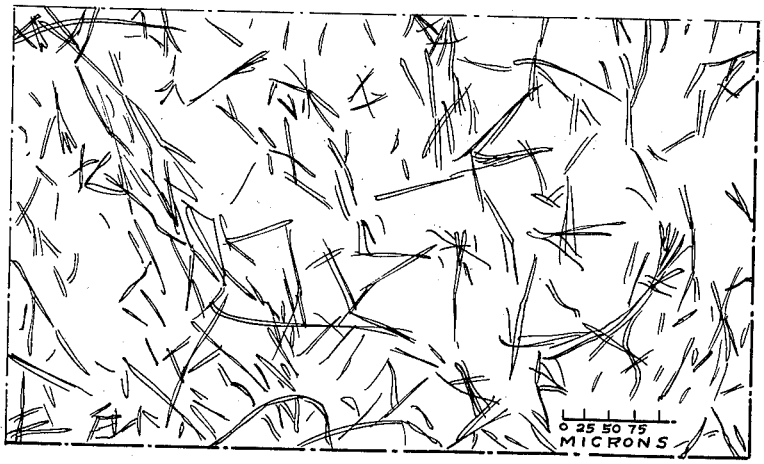

July 20, 1948.　　　G. H. FOSTER ET AL　　　2,445,478
CRYSTALLINE MATERIAL PREPARATION
Filed Sept. 6, 1944

INVENTORS
GEORGE H. FOSTER,
EMIL F. WILLIAMS,
BY
ATTORNEY

Patented July 20, 1948

2,445,478

UNITED STATES PATENT OFFICE 2,445,478

CRYSTALLINE MATERIAL PREPARATION

George H. Foster, Stamford, and Emil F. Williams, Old Greenwich, Conn., assignors to American Cyanamid Company, New York, N. Y., a corporation of Maine Application September 6, 1944, Serial No. 552,836

5 Claims. (Cl. 260—564)

This invention relates to a process for preparing crystalline nitroguanidine in an extremely minute crystalline state.

Heretofore it has been difficult and frequently impossible to prepare nitroguanidine in the form of discrete crystals of a size less than about 15 microns in width or less than about 300 or 400 microns in length. The usual methods of crystallization or recrystallization, even when supplemented by subsequent grinding or ball-milling in a porcelain mill ordinarily result in the production of much larger crystalline structures. Moreover, the grinding of such explosive material is a distinct hazard both to the workmen engaged and to the plants carrying out the process. In addition, however, such grinding simultaneously effects but a slight decrease in particle size.

It is an object of this invention to provide a method for the production of nitroguanidine of extremely small size in an efficient and economical manner. A further object is to prepare nitroguanidine in the form of small and uniformly very fine crystals.

It is also an object hereof to obtain, with the aid of a modifier chemical, crystals of nitroguanidine which are smaller and finer than those ordinarily obtained in the course of a conventional physical crystallization.

In its broadest aspects, the present invention contemplates the crystallization of nitroguanidine from an aqueous solution thereof in the presence of a compound having an amino or substituted amino grouping, hereinafter sometimes referred to as "amino compound." Such a method can be conveniently carried out in accordance with the principles of this invention by rapidly cooling a saturated aqueous solution of nitroguanidine to which has been added a small amount of an amino compound.

It has been found that the objects of the present invention may be more readily accomplished by the use of those compounds in which the amino group or groups have a high ratio to the remainder of the molecule. Thus, for example all the alkaline amines meet this requirement. Of these amino compounds the alkylene diamines are better than the higher alkylene polyamines which are in turn better than the polyalkylene polyamines although all such compounds are effective for the purpose.

An additional advantage of the process of this invention is found in that the product thus prepared is far more stable than a similar product crystallized in the absence of such a modifying compound. This may be attributed to the addition of amino compounds which effectively neutralize any acidity developed in the nitroguanidine as a result of its decomposition during storage. This stability is due principally to the fact that the fine crystals of nitroguanidine contain minute amounts of the addition agent. Depending on the addition agent used, the crystals can be rendered more or less readily dispersible in water or other media.

Figure 2:
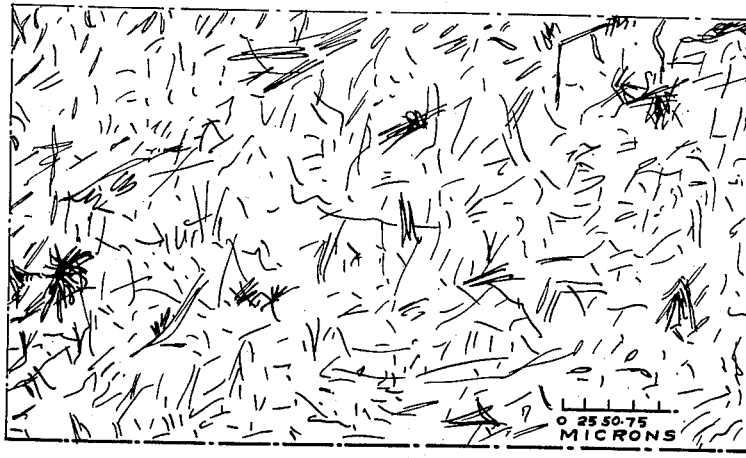

The improvements and advantages of the present invention are more readily appreciated when considered in conjunction with the drawing, in which:

Fig. 1 is a reproduction of a photomicrograph of nitroguanidine crystals prepared without a modifier and more particularly referred to in Example 3; and Fig. 2 is a reproduction of a photomicrograph of nitroguanidine crystals prepared in accordance with the method described below in Example 2.

The careful comparison, microscopical and otherwise, of the products prepared in several different ways shows clearly the superiority of nitroguanidine prepared by the methods of this invention, particularly for nitroguanidine which is to be incorporated in propellant powders. Moreover, when prepared as herein described, a more uniform product is obtained, very little variation being exhibited from the maximum to the minimum crystal size.

The following examples are included herein in order to facilitate a more complete understanding of the invention. A number of variations in the process are included below in order to illustrate the extended scope of the procedure herein disclosed.

Example 1

7 grams of coarse crystalline nitroguanidine was dissolved in about 100 cc. of water. Small portions of this solution, about 2 to 4 cc., were withdrawn and mixed in a test tube with 0.3 to 3%, based on the nitroguanidine present, of ethylene diamine. The test tube was immersed in a beaker of boiling water until the nitroguanidine was completely dissolved. A portion of this solution was poured into a test tube containing dry ice. The precipitated crystalline nitroguanidine was examined microscopically in order to measure the length and cross-section of its individual crystals. The resultant crystals were predominantly of a very small size, namely about 2.5 microns wide by about 20 microns long.

*Example 2*

An aqueous solution of nitroguanidine of about 7.5% strength was prepared and from 0.3 to 3% of ethylene diamine, was added. This solution was heated in an autoclave to about 100° C. and then sprayed into water having a temperature of 25° C. in an enclosed spray chamber. The precipitate formed was examined microscopically and showed a decided increase in the proportion of nitroguanidine crystals about 2.5 microns in width by about 20 microns in length as compared to nitroguanidine precipitated from a similar solution but which, however, was prepared without the addition of ethylene diamine. The latter crystals were about 5 x 150 microns in size.

In the following examples an aqueous solution of nitroguanidine of 7.5% strength was prepared and, after adding the modifier indicated, the solution was heated to a temperature of 102 to 105° C. and spray cooled.

| Example | Modifier | Particle size by number per cent of total | | | | | |
|---|---|---|---|---|---|---|---|
| | | Width | | | Length | | |
| | | <2.5μ | 2.5-5.0μ | >5.0μ | <50μ | 50-100μ | >100μ |
| 3 | None ("Blank") | 30.7 | 47.7 | 21.6 | All about 150 | | |
| 4 | 1.0% ethylol dodecyl biguanide acetate | 79.4 | 20.6 | 0.0 | 76.1 | 23.9 | 0.0 |
| 5 | 0.6% {Diethylene triamine / Triethylene tetramine / Tetraethylene Pentamine} | 97.5 | 2.5 | 0.0 | 94.0 | 6.0 | 0.0 |
| 6 | 0.4% Ethylene diamine | 99.9 | 0.1 | 0.0 | 99.2 | 0.8 | 0.0 |
| 7 | 0.3% Ethylene diamine | 85.9 | 14.1 | 0.0 | | | |
| 8 | do | 87.4 | 12.4 | 0.2 | 93.5 | 6.5 | 0.0 |
| 9 | 0.32% Ethylene diamine | 88.6 | 11.2 | 0.2 | 90.1 | 9.8 | 0.0 |

These examples indicate that the percentage of crystals less than 2.5 microns wide by actual count was amazingly increased by the use of an amino compound.

In the following examples each run consisted of a charge of 20.5 pounds of crude nitroguanidine and 275 pounds of water mixed in an autoclave at 100° C. The solution was then transferred to a blowcase and sprayed through ⅛ inch jets into an enclosed spray chamber containing a circulating charge of 300 pounds of water. In order to accelerate the cooling of the batches to 25° C., air was drawn through the chamber at the rate of 600 cu. ft. per minute. The temperature of the blowcase was held at 102°-105° C. and the spraying pressure was maintained at 100 pounds per square inch. In each run, the crystal size was varied by the use of ethylene diamine of the strength indicated. This was added to the charge and to the bath. The pH of the charge was adjusted with acetic acid after the addition of the ethylene diamine. The precipitated nitroguanidine was separated from the residue by centrifugal action or by filtration and the crystalline product was subsequently washed with water alone or, preferably, with water containing 0.1 per cent of ethylol dodecyl biguanide acetate.

The residual mother liquor from each run was used to make up the next charge and bath, sufficient water and ethylene diamine being added to compensate for that lost in the recrystallization and by evaporation.

EXAMPLE 10

WIDTH OF CRYSTALS <4 MICRONS

*Batch 1*

| Run No. | Weight of Ethylene Diamine Used | Per Cent Ethylene Diamine | pH | Weight of Nitroguanidine |
|---|---|---|---|---|
| | Gr. | | | Pounds |
| 44 | 1041 | 0.4 | 7.5 | 10 |
| 45 | 278 | 0.4 | 7.5 | 9 |
| 46 | 250 | 0.4 | 7.0 | 17 |
| 47 | 238 | 0.4 | 7.0 | 5 |
| 48 | 375 | 0.4 | 7.0 | 15 |
| 50 | 401 | 0.4 | 7.0 | 14 |
| 52 | 286 | 0.4 | 7.5 | 17 |
| 53 | 346 | 0.4 | 7.5 | 17 |
| 54 | 525 | 0.4 | 8.0 | 10 |
| 55 | 329 | 0.4 | 8.0 | 10 |
| 60 | 433 | 0.45 | 8.0 | 15 |
| Total | 4502 | | | 129 |

EXAMPLE 11

WIDTH OF CRYSTALS <3 MICRONS

*Batch 2*

| Run No. | Weight of Ethylene Diamine Used | Per Cent Ethylene Diamine | pH | Weight of Nitroguanidine |
|---|---|---|---|---|
| | Gr. | | | Pounds |
| 56 | 364 | 0.4 | 8.0 | 30 |
| 57 | 333 | 0.4 | 8.0 | |
| 61 | 220 | 0.45 | 8.0 | 11 |
| 62 | 584 | 0.45 | 8.0 | 11 |
| 63 | 349 | 0.45 | 8.0 | 12 |
| 64 | 259 | 0.45 | 8.0 | 11 |
| 65 | 328 | 0.45 | 8.0 | 15 |
| 66 | 203 | 0.45 | 8.0 | 14 |
| 67 | 376 | 0.45 | 8.0 | 14 |
| Total | 3,016 | | | 118 |

By actual microscopical count the percentage of crystals varying in width from <1 micron to <5 microns was as follows:

| <1 | <2 | <3 | <5 |
|---|---|---|---|
| 76.8 | 98.0 | 99.9 | 100.0 |

EXAMPLE 12

WIDTH OF CRYSTALS <5 MICRONS

Batch 3

| Run No. | Weight of Ethylene Diamine Used | Per Cent Ethylene Diamine | pH | Weight of Nitroguanidine |
|---|---|---|---|---|
| | Gr. | | | Pounds |
| 49 | 253 | 0.4 | 7.0 | 17 |
| 51 | 286 | 0.4 | 7.0 | 15 |
| 54 | 525 | 0.4 | 8.0 | 15 |
| 55 | 329 | 0.4 | 8.0 | |
| 58 | 0.00 | 0.3 | 8.0 | 3.0 |
| 59 | 3.64 | 0.4 | 8.0 | |
| 68 | 81 | 0.3 | 8.0 | 16 |
| 69 | 182 | 0.3 | 8.0 | 16 |
| Total | | | | 109 |

Various methods can be used to effect the desired crystallization. For example, spray cooling chambers may be utilized or spraying the solution in the form of fine streams into, or preferably under, an ice-water bath are among various other methods which can be used for the sudden cooling or chilling of solutions in order to precipitate the solute in finely divided form.

The very fine crystalline materials thus prepared find use in the manufacture of explosives. For example, a more highly effective type of explosive, namely a more powerful cordite, is obtained when such very fine crystals of nitroguanidine are used as can be prepared in accordance with the principles of this invention.

In particular, the use of such small crystals of nitroguanidine as above prepared in plastic cordite results in a greatly accelerated rate of propagation of the flame upon explosion and, moreover, it has been found that the oxidation of cordite is directly dependent upon the degree of subdivision of the crystalline nitroguanidine used. Thus, it has been definitely established that the small crystals of nitroguanidine produced in accordance with this invention are far more desirable for incorporation in cordite than the larger crystals heretofore used.

The following amino or substituted amino compounds either alone or in admixture have been found to be effective for the purpose of this invention when used in amounts of from 0.3 to 3% based on the weight of the nitroguanidine. These are in addition to those specifically or generally mentioned above.

Ethylol dodecyl biguanide acetate
Ethylol dodecyl biguanide hydrochloride
Casein (dissolved in dilute NH4OH)
Casein (dissolved in dilute sodium tetraphosphate solution)
Corn oil condensed with monoethylol cyanamide
1.3 diethylol 5-butyl biguanide diacetate
Di-ortho-tolyl guanidine
Di-phenyl guanidine
Di-xylyl guanidine
(Di-ortho-tolyl guanidine)4SnCl4
Ethylene diamine
Ethylene diamine+acetic acid
Ethylene diamine+H2SO4
Ethylene diamine+HCl
Animal glue
Mixed diethylene triamine, triethylene tetramine, and tetraethylene pentamine+acetic acid
Mixed diethylene triamine, triethylene tetramine, and tetraethylene pentamine
Phenyl biguanide
Soy bean fatty acids condensed with monoethylol cyanamide
Tetraethylene pentamine+acetic acid
(Di-ortho-tolyl guanidine)2ZnCl2
(Diaryl dithiophosphoric acids)+thiocarbanilide
Ethylol dodecyl guanidine acetate
Hexa or octadecyl guanidine acetate
Al2(SO4)2(diphenyl guanidine)6
Castor oil fatty acids condensed with monoethylol cyanamides
Cyanoaceto guanamine
α-2-cymel biguanide hydrochloride
Cyanurea
Ethylene α-o-tolyl biguanide hydrochloride
Furfural (mixed) xylol biguanide
Glutamic acid
Glycine
Guanidine thiocyanate
β-methoxy butyro guanamine
Methylene o-tolyl biguanide
Monoethylol cyanamide condensed with ethylene diamine
Phenyl biguanide carbonate
α-tertiary amyl phenyl biguanide hydrochloride
α-mixed xylyl biguanide hydrochloride
Acetamidine anthranilate
p-Amino acetophenon
Benzylidene α-tolyl biguanide hydrochloride
Benzoguanamine-2-sulfonic acid
Black liquor soap condensed with monoethylol cyanamide
Sec. butyl phenyl biguanide hydrochloride
o-Carbamyl benzoguanamine
Coconut oil—polyethylene amines condensed with same
Diethylol amine
Dimethylol urea
Ethylidene α-(sec. butyl phenyl) biguanide hydrochloride
Ethylidene α-(o-tolyl) biguanide hydrochloride
β-ethoxy butyro guanamine
Guanidine carbonate+acetic acid
Guanidine carbonate
Glutaro guanamine
Hexamethylene tetramine
Hydroxyl amine hydrochloride
Meta-nitro aniline
Morpholine biguanide sulfate
Piperazine hexahydrate
Acid salts of the condensate of a fatty acid and ethylene diamine
Water soluble glucosides+methyl cellulose+a wetting agent
Sebaco guanamine
α-β-Di-o-tolyl biguanide Thus, the general effect of such modification of crystal habit can be definitely attributed to the presence of an amino or substituted amino group.

No completely satisfactory theoretical explanation of the manner in which these modifying agents function, other than that above given, can be offered.

The present application is a continuation-in-part of copending application Serial No. 417,064, filed October 30, 1941 now U. S. Patent 2,395,856.

While the invention has been described with particular reference to specific embodiments, it is to be understood that it is not to be limited thereto, but is to be construed broadly and restricted solely by the scope of the appended claims.

What is claimed:

1. A method of preparing finely divided nitroguanidine which includes the step of crystallizing the same from an aqueous solution thereof in the presence of a crystal modifying amount of a member of the group consisting of amino and substituted amino compounds.

2. A method of preparing finely divided nitroguanidine which includes the step of crystallizing the same from an aqueous solution thereof in the presence of from .3 to 3% of an alkylene amine.

3. A method of preparing finely divided nitroguanidine which includes the step of crystallizing the same from an aqueous solution thereof in the presence of from .3 to 3% of an alkylene polyamine.

4. A method of preparing finely divided nitroguanidine which includes the step of crystallizing the same from an aqueous solution thereof in the presence of from .3 to 3% of a polyalkylene polyamine.

5. A method of preparing finely divided nitroguanidine which includes the step of crystallizing the same from an aqueous solution thereof in the presence of from 0.3 to 3% of a member of the group consisting of amino and substituted amino compounds.

GEORGE H. FOSTER.
EMIL F. WILLIAMS.

REFERENCES CITED

The following references are of record in the file of this patent:

UNITED STATES PATENTS

| Number | Name | Date |
| --- | --- | --- |
| 1,679,752 | Lanberg | Aug. 7, 1928 |
| 2,258,612 | Jayne | Oct. 14, 1941 |
| 2,395,856 | Foster et al. | Mar. 15, 1946 |
| 2,395,857 | Foster et al. | Mar. 15, 1946 |
| 2,395,858 | Foster et al. | Mar. 15, 1946 |
| 2,395,859 | Foster et al. | Mar. 15, 1946 |
| 2,395,860 | Foster et al. | Mar. 15, 1946 |

OTHER REFERENCES

Davis: Chemistry of Powder and Explosives (1943), vol. II, pages 386–387.